United States Patent
Lim et al.

(12) 
(10) Patent No.: US 6,383,532 B1
(45) Date of Patent: *May 7, 2002

(54) PRODUCTION OF A HYDROLYSATE

(75) Inventors: Bee Gim Lim; Tsui Luan Ng, both of Singapore (SG); Sven Heyland, Weiningen (DE); Thang Ho Dac, Le Mont/Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/552,509

(22) Filed: Apr. 19, 2000

Related U.S. Application Data

(63) Continuation-in-part of application No. PCT/EP98/06523, filed on Oct. 12, 1998.

(30) Foreign Application Priority Data

Oct. 31, 1997 (EP) ............................................. 97119011

(51) Int. Cl.$^7$ ............................. A23B 7/10; A23L 1/105
(52) U.S. Cl. ............................... 426/52; 426/7; 426/46; 426/49; 426/60
(58) Field of Search ............................. 426/49, 52, 18, 426/44, 46, 48, 60, 615, 658, 7

(56) References Cited

U.S. PATENT DOCUMENTS

| | | | |
|---|---|---|---|
| 4,308,284 A | 12/1981 | Noda et al. | 426/7 |
| 4,587,127 A | 5/1986 | Akao et al. | 426/46 |
| 5,141,756 A | 8/1992 | Bajracharya et al. | 426/46 |
| 5,965,178 A | * 10/1999 | Baensch et al. | 426/52 |

FOREIGN PATENT DOCUMENTS

JP   5244897 A   9/1993

* cited by examiner

*Primary Examiner*—Leslie Wong
(74) *Attorney, Agent, or Firm*—Winston & Strawn

(57) ABSTRACT

The invention relates to a hydrolysate and a process for the production of the hydrolysate. The process includes a fermenting step wherein a Koji substrate of a protein containing material and a carbohydrate that has been injected with a culture of a lactic acid bacteria that is capable of imparting a specific characteristic note to the hydrolysate is fermented to produce a fermented Koji and a hydrolysis step wherein the fermented Koji is hydrolyzed at a temperature of between about 2° C. and 50° C. and a pH of from about 5.6 to 7.0 for a period of from about 1 to 20 days to produce a hydrolysate. The characteristic note of the hydrolysate is stronger than if the inoculation with the lactic acid bacteria occurred after the fermentation stage.

19 Claims, No Drawings

PRODUCTION OF A HYDROLYSATE

CROSS REFERENCE TO RELATED APPLICATIONS

This application is a continuation-in-part of the designated U.S. national phase of International Application No. PCT/EP98/06523, filed Oct. 12, 1998, the contents of which is expressly incorporated herein by reference thereto.

TECHNICAL FIELD

The present invention relates to a process for the production of a hydrolysate, in particular the production of hydrolysate by the biological hydrolysis of a protein containing material. The various forms of the hydrolysate can be used as a sauce, seasoning agent, or a base for culinary products.

BACKGROUND ART

Hydrolyzed proteins in the form of a soya sauce have been used as seasonings in food systems for centuries in the Far East. Traditionally the soya sauce was prepared by fermentation for a long period of time, usually several months. In producing soya sauce, plant protein containing materials such as cooked soya beans or defatted soy grits together with carbohydrates are inoculated with Aspergilli and the semi solid product is fermented for 2 days to make a Koji. During this time enzymes are produced that are able to hydrolyze the protein and carbohydrates in a second stage, called the moromi stage. The fermented Koji is mixed with a solution of common salt to provide the moromi, which is then fermented for 4 to 8 months by the soya lactic acid bacteria and soya yeasts. The soya sauce is obtained by removing the insoluble fractions from the fermented moromi.

About 100 years ago, a more rapid method of hydrolyzing proteins to produce seasonings was developed. This method uses hydrochloric acid and the time required for hydrolysis is only a few hours. In recent years, however, the use in culinary applications of acid hydrolyzed plant protein (HPP) has been under criticism due to the presence of chlorocompounds that arise from the acid process. Therefore, attempts have been made to develop HPP replacements that can be used as body-givers in culinary applications. Soya sauce is one such suitable replacement.

HPP and soya sauce, however, are not the same. For example, there are differences in the chemical composition and flavor profile of HPP and soya sauce owing to the differences in the raw materials and the processing methods involved. In addition, the dosage or amount of soya sauce that can be used as an HPP replacement is also limited due to its "fermented" note. Furthermore, the different processing procedures results in a significant variation in the degree that the protein containing materials are hydrolyzed to amino acids. Also soya sauce has a lower amino acid content than HPP that leads to a significantly weaker body in soya sauce than in HPP. Thus, there is a need in the culinary field for improved HPP replacements such as soya sauce.

SUMMARY OF THE INVENTION

The present invention relates to a process for production of a hydrolysate as well as to the hydrolysates thus produced and their use in culinary products. The process includes fermenting a Koji substrate that contains a protein containing material and a carbohydrate that has been inoculated with a culture of a lactic acid bacteria that is capable of imparting a specific characteristic note to the hydrolysate at an inoculation density of from about $10^3$ to $10^7$ cfu/g of fermented Koji to produce a fermented Koji. Next, the fermented Koji is hydrolyzed at a temperature of between about 2° C. and 50° C. and a pH of from about 5.6 to 7, and preferably 5.8 to 6.6, for a period of from about 1 to 20 days to produce the hydrolysate. The hydrolysate has a characteristic note that is stronger than if the inoculation with the lactic acid bacteria occurred after the fermentation stage.

The lactic acid bacteria may be *L. sake, L. plantarum, L. cuvatus*, or a mixture thereof. The Koji may be fermented by inoculating a culture bed of the protein containing material and the carbohydrate with a culture of *Aspergillus oryzae, Aspergillus sojae*, or a mixture thereof.

The protein containing material may be a plant protein material containing cysteine in an amount of between about 0.5 to 3% by weight of the protein containing material. The protein containing material may be selected from the group consisting of soya, wheat germ, corn gluten, rice gluten, wheat gluten, or a mixture thereof. The amount of protein containing material in the Koji substrate may be from about 30 to 100% and preferably from about 70 to 90%. The protein containing material may be cooked and in solid particulate form. In one embodiment the protein containing material is fermented in the solid state.

Hydrolysis of the fermented protein Koji may be carried out in the presence of water and in the absence of salt. When the hydrolysis is carried out in the presence of water and in the absence of salt it may be carried out at a temperature of between about 30° to 37° C. for a period of between about 2 to 5 days. The hydrolysis of the fermented protein Koji may also be carried out in the presence of water and in the presence of salt in an amount of up to about 100% by weight based on the weight of the fermented Koji.

The hydrolysis may also be carried out in stages. In one embodiment, the hydrolysis is carried out in a first hydrolysis stage at a temperature of from about 40° to 25° C. for a period of from about 1 to 48 hours and then a second hydrolysis stage at a temperature of from about 25° to 50° C. for a period of from about 1 to 20 days.

In another embodiment, an additional protein that contains cysteine in an amount of between about 0.5 and 3% by weight of the protein is added to the fermented Koji at the beginning of the hydrolysis.

The hydrolysate may be pressed to separate a liquid sauce from a solid residue. The present invention also relates to the liquid sauce prepared by pressing the hydrolysate The liquid sauce may be pasteurized at a temperature of from about 90° to 140° C. for a period of from about 15 seconds to 30 minutes and filtered to give a liquid seasoning. The present invention also relates to the liquid seasoning prepared by pasteurization.

Salt may be added to the hydrolysate or to the liquid sauce to give a liquid sauce having a salt content of up to about 60% by weight based on the weight of dried matter. The liquid sauce may also be concentrated to produce a concentrate, the concentrate dried to a low moisture content to give a dry concentrate, and the dry concentrate milled to give a powdered solid seasoning. The present invention also relates to the solid seasoning prepared according to the above-described process.

The hydrolysate may also be dried to give a dried hydrolysate and the dried hydrolysate mixed with water, salt, and reducing sugars to give a base for an aromatizing agent for a culinary product in the form of a paste. The paste may have a dry matter content of from 35 to 55% by weight and contain, on a dry matter basis, from about 24 to 97% of the hydrolysate, about 2 to 40% salt, and about 1 to 4% reducing sugar.

The present invention also relates to a base for an aromatizing agent for a culinary product prepared according to the above-described process. The dried hydrolysate may be mixed with a sulphur containing amino acid or thiamine so that the paste contains, on a dry matter basis, from about 0 to 2% of the sulphur containing amino acid or thiamine. The paste may also be heated at a temperature of from between about 80° and 150° C. for a period of time of between about 1 minute and 4 hours. The paste may also be dried to a residual water level of up to about 2% to provide a base for an aromatizing agent for a culinary product as a dried powder.

DETAILED DESCRIPTION OF THE PREFERRED EMBODIMENTS

In our U.S. Pat. No. 5,965,178, we describe a process or the production of a seasoning which comprises preparing a fermented protein Koji from a protein containing material and a carbohydrate, hydrolyzing the fermented protein Koji at a temperature between 15° C. and 60° C. an a pH of from 4.5 to 10 for a period of from 6 hours to 28 days characterized in that the protein containing material and the carbohydrate are inoculated with a culture of a lactic acid bacteria at an inoculation density of from $10^3$ to $10^7$ cfu/g of fermented protein Koji at either the fermented protein Koji stage or in the hydrolysis stage.

We have now surprisingly found that certain specific lactic acid bacteria are capable of imparting a specific characteristic note to the seasoning, for example, a meaty, seafood, or cereal note. Moreover, the note is stronger if the lactic acid bacteria inoculation takes place at the beginning of the fermentation step than if inoculation with the same lactic acid bacteria occurs after the fermentation step. The hydrolysate produced also has a very much stronger note than hydrolysates produced using other lactic acid bacteria. Without wishing to be bound by theory, we believe that during fermentation, the specific lactic acid bacteria produces specific enzymes that convert sulphur containing amino acid in the protein substrate, for example cysteine, into hydrogen sulphide that acts as a precursor to building blocks for the development of a meaty note.

For reasons of simplicity, the lactic acid bacteria capable of imparting a specific characteristic note to the seasoning that is stronger when it is inoculated at the beginning of the fermentation stage than if it is inoculated after the fermentation stage will be referred to in the description as the "specific lactic acid bacteria." Examples of suitable specific lactic acid bacteria are *L. sake, L. plantarum*, and *L. cuvatus*. It should be understood that, according to the invention, mixtures of two or more cultures of the specific lactic acid bacteria may be used, for example, mixtures of *L. sake* and *L. plantarum*, mixtures of *L. sake* and *L. cuvatus*, or mixtures of *L. plantarum* and *L. cuvatus*.

It should also be understood that longer periods of time are generally required for hydrolysis at lower temperatures and shorter periods of time are required at higher temperatures.

The fermented Koji is prepared by a process similar to the preparation of a conventional soya sauce and includes, for example, inoculating a protein containing material and a carbohydrate with, in addition to a culture of the specific lactic acid bacteria, a culture of *Aspergillus oryzae* and/or *Aspergillus sojae* on a culture bed to form the fermented Koji. The specific lactic acid bacteria may be added before or after the culture of Aspergillus is added. If the specific lactic acid bacteria is added after the culture of Aspergillus, however, it should be added soon after the commencement of fermentation, generally within about 1 hour. Preferably the specific lactic acid bacteria is added, within about 30 minutes, more preferably within about 15 minutes, more preferably within about 5 minutes, and most preferably within about 1 minute.

The protein containing material is advantageously a plant protein material containing a high proportion of cysteine. Preferably, the plant protein material contains from about 0.5 to 3% cysteine by weight and more preferably from about 0.75 to 2% by weight. The protein containing material may be, for example, soya, wheat germ, corn gluten, rice gluten, or a mixture thereof. Preferably the plant protein containing material is wheat gluten, to produce an increased level of sulphide in the hydrolysate and, thus, an increased meaty note.

The degree of characteristic note, for example, a meaty, seafood, or cereal note may also be varied by varying the proportions of protein and carbohydrate in the Koji substrate. The Koji substrate may contain, for example, protein in an amount of from about 30 to 100%. Preferably the amount of protein is from about 70 to 90%. The plant protein containing material is advantageously cooked and preferably is used in solid particulate form to enable the mold of *Aspergillus oryzae* and/or *Aspergillus sojae* to grow on the surface of the particles and eventually penetrate into the particles. The particles of the plant protein material, which may be in the form of pellets, preferably have an average diameter of from about 2 to 10 mm, more preferably from about 3 to 8 mm, and most preferably from about 4 to 7 mm. The Koji is conveniently fermented in the solid state.

During the fermentation stage, the specific lactic acid bacteria grow rapidly and, by the end of the fermentation, dominate the flora at a level of between about $10^8$ to $10^9$ cfu/g along with the *A. oryzae*. The quality of the =Koji is therefore clean with respect to other possible contaminants. By adding the specific lactic acid bacteria at the beginning of the fermentation, the type of microflora present is controlled right from the start and there is no opportunity for contaminants to multiply. The high level of bacteria in the fermented Koji increases the protection against the growth of undesirable microorganisms in the subsequent hydrolysis.

The hydrolysis of the fermented protein Koji may be carried out in the presence of water and may be carried out in the absence of or in the presence of salt. Preferably, the hydrolysis is carried out in the absence of salt at a temperature from about 30° to 37° C. over a period of from about 2 to 5 days, in order to maximize the enzyme activity of *L. sake*, which leads to the production of a stronger meaty flavor in the hydrolysate. When salt is present, the amount of salt may be up to 100% by weight based on the weight of the fermented Koji. Advantageously, the hydrolysis is carried out with constant agitation. Optionally, a two-stage hydrolysis may be used, for example, a first stage hydrolysis at a temperature of from about 40° to 25° C. over a period of from about 1 to 48 hours followed by a second stage hydrolysis at a temperature of from about 25° to 50° C. over a period of from about 1 to 20 days.

If desired, additional protein, containing a high proportion of cysteine, for example, wheat gluten, may be added at the beginning of the hydrolysis stage to increase the meaty note.

At the end of the hydrolysis stage, the level of the reducing sugars is very low, i.e., usually less than about 0.3%. As a result of the low level of reducing sugars the maturation of the moromi can be eliminated. By eliminating maturation of the moromi the production time can be shortened by about 1 to 6 weeks.

Following the hydrolysis stage, the hydrolyzed fermented Koji, together with the culture of the specific lactic acid bacteria, may be pressed to separate a liquid sauce from a solid residue. Advantageously, the liquid sauce is pasteurized, for example, at a temperature of from about 90° to 140° C. for a period of from about 15 seconds to 30 minutes. The liquid sauce is then filtered to give a liquid seasoning. If desired, salt may be added either before or after pressing or filtering to give a product having a salt content of between about 0 and 60% by weight based on the weight of dried matter. If desired, the liquid sauce may be made into a powder for instance, by concentration; followed by drying, for example, by vacuum drying to a low moisture content; and finally milling into a powder to give a solid seasoning.

The hydrolysate produced by the process of the present invention may be used, in either liquid, paste or solid form, as a base for an aromatisation agent for culinary products. The paste may have a dry matter content of from about 35 to 55% by weight and is produced by drying the hydrolysate and mixing it with water, salt, reducing sugars, and optionally a sulphur containing amino acid or thiamine. The paste contains, on a dry matter basis, from about 24 to 97% of the hydrolysate, about 2 to 40% salt, about 1 to 4% reducing sugars, and from about 0 to 2% of a sulphur containing compound, for example, an amino acid such as cysteine or thiamine. If desired, the paste can be heated at a temperature of from about 80° to 150° C., preferably from about 90° to 110° C. for from about 1 minute to 4 hours, preferably from about 1 hour to 2 hours. The heated paste may afterwards be dried to a residual water level of up to about 2%.

The hydrolysates of the present invention may be used as body givers for culinary products in process flavor applications, for example, beef, seafood, cereal, and chicken flavors and as ingredients for HPP replacers. When the sauce powder is reconstituted in water, the product has a much lighter color, a strong flavor, and is more neutral with respect to the typical fermented note found in the standard wheat gluten sauce.

EXAMPLES

The invention is further defined by reference to the following examples describing in detail the hydrolysate and methods of the present invention. The examples are representative, and should not be construed to limit the scope of the invention in any way. In the following Examples all parts and percentages are given by weight.

Example 1

A mixture of wheat gluten and wheat bran (93:7) was extruded through a Clextral extruder to obtain pellets with a porous structure having an average diameter of about 5 mm. 75 kg of the extrudate was mixed with 25 kg of roasted wheat and soaked in 75 kg of water at 75° C. for 5 minutes. The soaked extrudate was heated to 100° C., held at 100° C. for 10 minutes, and then cooled to below 40° C. by applying a vacuum. The cooked extrudate was then mixed with a liquid suspension containing 25 g of Aspergillus oryzae spores inoculum and 340 g of a culture of $L.$ $sake$ at $7 \times 10^5$ cfu/g of cooked extrudate.

During the 42 hours of Koji fermentation, the following temperature profiles were maintained for the culture bed:

0–25 hours 30° C.

25–42 hours 27° C.

The Koji was mixed at the $18^{th}$ and $25^{th}$ hours to ensure sufficient airflow through the culture bed for good ventilation. The microbiological quality was very good during the fermentation and the coliform count was $<10^2$ cfu/g throughout. After the fermentation, the level of $L.$ $sake$ had risen to $3.3 \times 10^9$ cfu/g.

Following the Koji fermentation, the matured Koji was harvested. Hydrolysis was carried out in a hydrolysis tank by adding water to obtain a hydrolysate with a total solid content of 20.2 m/m. The hydrolysis was carried out at 35° C. for 48 hours. During the hydrolysis, a rapid drop in pH (initial pH=6.4) was observed due to the growth of the $L.$ $sake$. A pH of 6 was reached after approximately 2 hours of hydrolysis. Thereafter, a 40% NaOH solution was added in order to maintain the pH at a value of 6. The high count of $L.$ $sake$ observed in the Koji continued to dominate in the hydrolysate and the development of coliforms was again under good control.

Finally, the hydrolyzed mixture was pressed to separate a wheat gluten sauce from a solid residue. Salt was added to a level of 12% m/m before pressing. The wheat gluten sauce was treated at a temperature of about 90° C. for about 20 minutes. The liquid sauce was then concentrated by evaporation and the resulting concentrate dried in a vacuum oven and milled into a powder.

For organoleptic evaluation, 12.5 g of the liquid sauce or 3.5 g of the powder were diluted with 250 ml of boiling water. In both cases the product was found to have a meaty background note that did not have the disadvantage of a "fermented note". The product was very light in color and was versatile in culinary applications.

Example 2

A similar procedure to that described in Example 1 was followed except that the Koji prepared according to Example 1 was mixed with wheat gluten powder (Koji:wheat gluten powder=7:3) in the hydrolysis stage. The water quantity was adjusted such that the dried matter content of the hydrolysate was 20.2%.

A higher level of sulphide was detected in the hydrolysate compared to Example 1. This is due to a higher protein content (TN=13.0%, dried weight basis) compared to wheat gluten Koji alone (TN=11.3%, dried weight basis), which gave rise to a higher content of cysteine. The reduced carbohydrate content also reduced the availability of carbohydrate as a source for metabolism by the $L.$ $sake$. As a result, there was a higher uptake of cysteine and production of hydrogen sulphide. The hydrolysate had a strong meaty flavor.

Example 3

A similar procedure to that described in Example 1 was followed except that the carbohydrate content was reduced in the substrate for Koji preparation. The mixture used was 85% wheat gluten, 5% wheat bran, and 10% wheat flour.

The cooked substrate was inoculated with $L.$ $sake$ and $A.$ $oryzae$. The microbiological results showed that the growth of $L.$ $sake$ was not affected by the change to a reduced carbohydrate recipe. A higher level of sulphide was detected in the hydrolysate compared to Example 2 and the hydrolysate had a strong meaty flavor.

Example 4

A similar procedure to that described in Example 3 was followed except that salt was not added to the hydrolysate. A salt free sauce or powder was obtained with a strong meaty flavor.

Example 5

A similar procedure to that described in Example 1 was followed except that the hydrolysis was carried out at a temperature of about 22° C. for 10 days. A salt free sauce or powder was obtained with a strong meaty flavor.

Example 6

A similar procedure to that described in Example 3 was followed except that the hydrolysis was extended to 5 days to increase the degree of hydrolysis. A salt free sauce or powder was obtained with a strong meaty flavor.

Example 7

A similar procedure to that described in Example 2 was followed except that corn gluten powder was used instead of wheat gluten powder. A salt free sauce or powder was obtained with a strong meaty flavor.

Example 8

The dried hydrolysate described in Example 1 was used as the base for an aromatisation agent for culinary products. To prepare this agent, 47.8 parts of the hydrolysate powder was mixed with 17.0 parts of water, 13.3 parts of salt, 8.3 parts of yeast extract, 1.1 parts of cysteine, 1.1 parts of thiamine, 0.8 parts of glucose, and 0.1 parts of onion extract. The paste was heated in a double jacketed kettle for about 90 minutes at 100° C. and dried under a reduced pressure of 15 mbar to a dry matter level of 98%.

Example 9

A similar procedure to that described in Example 1 was followed except that a culture of *L. plantarum* was inoculated instead of a culture of *L. sake*. The product was found to have a seafood background note which did not have the disadvantage of a fermented note.

Example 10

A similar procedure to that described in Example 1 was followed except that a culture of *L. cuvatus* was inoculated instead of a culture of *L. sake*. The product was found to have a background cereal note which is different from wheat gluten and did not have the disadvantage of a fermented note.

Example 11

A similar procedure to that described in Example 1 was followed except that a mixed culture of *L. sake* and *L. plantarum* was inoculated instead of a culture of *L. sake*. The product was found to have a meaty background note which is different from wheat gluten and did not have the disadvantage a fermented note.

Example 12

A similar procedure to that described in Example 1 was followed except that the hydrolysis was carried out at 20° C. for the first 10 hours followed by hydrolysis at 35° C. for another 4 days.

Comparative Example

A similar procedure to that described in Example 1 was followed except that the pH of the hydrolysis was allowed to vary, i.e., the pH was not controlled. The pH of the hydrolysate dropped to 4.5 after 4 hours of hydrolysis. After 8 hours of hydrolysis, the pH was adjusted to 6 and maintained at that value throughout the 48 hours of hydrolysis. With this pH profile, the level of sulphide was negligible during the 48 hours of hydrolysis. The resulting sauce had a less meaty note than the product of Example 1.

These results indicate that the pH should be greater than about 5.6 but less than 7 at least during the growth phage of the *L. sake*, i.e., for about the initial 2 to a hours of hydrolysis. A preferred range is 5.8 to 6.5.

What is claimed is:

1. A process for production of a hydrosylate comprising the steps of:

fermenting a Koji substrate comprising a protein containing material and a carbohydrate that has been inoculated at the beginning of the fermentation step with a culture of lactic acid bacteria selected from the group consisting of *L. sake, L. plantarum, L. cuvatus*, and mixtures thereof that is capable of imparting a specific characteristic note to the hydrosylate at an inoculation density of about $10^3$ to $10^7$ cfu/g of fermented Koji, the fermenting step being conducted under conditions sufficient to produce a fermented Koji; and hydrolyzing the fermented Koji at a temperature of about 2° C. to 50° C. and a pH of 5.8 to 6.5 for a period of about 1 to 20 days to produce a hydrosylate, wherein the characteristic note of the hydrosylate is stronger than if the inoculation with the lactic acid bacteria occurred after the fermentation stage.

2. The process of claim 1 wherein the Koji is fermented by inoculating a culture bed of the protein containing material and the carbohydrate with a culture of *Aspergillus oryzae, Aspergillus sojae*, or a mixture thereof.

3. The process of claim 1 wherein the protein containing material is a plant protein material containing cysteine in an amount of between about 0.5 to 3% by weight of the protein containing material.

4. The process of claim 1 wherein the protein containing material is selected from the group consisting of soya, wheat germ, corn gluten, rice gluten, wheat gluten, and mixtures thereof.

5. The process of claim 1 wherein the amount of protein containing material in the Koji substrate is from about 30 to 90%.

6. The process of claim 1 wherein the protein containing material is cooked and is in solid particulate form.

7. The process of claim 1 wherein the protein containing material is fermented in the solid state.

8. The process of claim 1 wherein the hydrolysis of the fermented protein Koji is carried out in the presence of water and in the absence of salt at a temperature of between about 30° to 37° C. for a period of between about 2 to 5 days.

9. The process of claim 1 wherein the hydrolysis of the fermented protein Koji is carried out in the presence of water and in the presence of salt in an amount of up to about 100% by weight based on the weight of the fermented Koji.

10. The process of claim 1 wherein the hydrolysis is carried out in a first hydrolysis stage followed by a second hydrolysis stage, wherein the first hydrolysis stage is at a temperature of from about 40° to 25° C. for a period of from about 1 to 48 hours and the second hydrolysis stage is at a temperature of from about 25° to 50° C. for a period of from about 1 to 20 days.

11. The process of claim 1 further comprising adding to the fermented Koji at the beginning of the hydrolysis additional protein that contains cysteine in an amount of between about 0.5 and 3% by weight of the protein.

12. The process of claim 1 further comprising the step of pressing the hydrolysate to separate a liquid sauce from a solid residue.

13. The process of claim 12 further comprising the steps of pasteurizing the liquid sauce at a temperature of from about 90° to 140° C. for a period of from about 15 seconds to 30 minutes and filtering the sauce to give a liquid seasoning.

14. The process of claim 12 further comprising adding salt to the hydrolysate or the liquid sauce to give a liquid sauce having a salt content of from about 1 to 60% by weight based on the weight of dried matter.

15. The process of claim 12 further comprising the steps of concentrating the liquid sauce to produce a concentrate, drying the concentrate to a low moisture content to give a dry concentrate, and milling the dry concentrate to give a powdered solid seasoning.

16. The process of claim 1 further comprising the steps of:
drying the hydrolysate to give a dried hydrolysate; and
mixing the dried hydrolysate with water, salt, and reducing sugars to give a base for an aromatizing agent for a culinary product in the form of a paste, wherein the paste has a dry matter content of from 35 to 55% by weight and contains, on a dry matter basis, from about 24 to 97% of the hydrolysate, about 2 to 40% salt, and about 1 to 4% reducing sugar.

17. The process of claim 16 further comprising the step of mixing the dried hydrolysate with a sulphur containing amino acid or thiamine so that the paste contains, on a dry matter basis, from about 0 to 2% of the sulphur containing amino acid or thiamine.

18. The process of claim 16 further comprising the step of eating the paste at a temperature of from between about 80° and 150° C. for a period of time of between about 1 minute and 4 hours.

19. The process of claim 16 further comprising the step of drying the paste to a residual water level of up to about 2% to provide a base for an aromatizing agent for a culinary product as a dried powder.

* * * * *

UNITED STATES PATENT AND TRADEMARK OFFICE
CERTIFICATE OF CORRECTION

PATENT NO. : 6,383,532 B1  
DATED : May 7, 2002  
INVENTOR(S) : Lim et al.

It is certified that error appears in the above-identified patent and that said Letters Patent is hereby corrected as shown below:

<u>Column 10,</u>
Line 10, change "eating" to -- heating --.

Signed and Sealed this

Eighteenth Day of June, 2002

*Attest:*

*Attesting Officer*

JAMES E. ROGAN
*Director of the United States Patent and Trademark Office*